United States Patent
Su et al.

(10) Patent No.: US 10,880,051 B2
(45) Date of Patent: Dec. 29, 2020

(54) METHOD AND APPARATUS FOR PERFORMING A HARQ FEEDBACK AND RETRANSMISSION

(71) Applicant: Samsung Electronics Co., Ltd., Suwon-si (KR)

(72) Inventors: Di Su, Beijing (CN); Bin Yu, Beijing (CN); Chen Qian, Beijing (CN); Qi Xiong, Beijing (CN); Yingjie Zhang, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/464,204

(22) PCT Filed: Nov. 23, 2017

(86) PCT No.: PCT/KR2017/013421
§ 371 (c)(1),
(2) Date: May 24, 2019

(87) PCT Pub. No.: WO2018/097619
PCT Pub. Date: May 31, 2018

(65) Prior Publication Data
US 2019/0393993 A1    Dec. 26, 2019

(30) Foreign Application Priority Data
Nov. 25, 2016 (CN) .......................... 2016 1 1063615

(51) Int. Cl.
*H04L 1/18* (2006.01)
*H04L 1/16* (2006.01)
(Continued)

(52) U.S. Cl.
CPC .......... *H04L 1/1819* (2013.01); *H04L 1/1621* (2013.01); *H04L 5/0055* (2013.01); *H04L 2001/125* (2013.01)

(58) Field of Classification Search
CPC .... H04L 1/1819; H04L 1/1621; H04L 5/0055
See application file for complete search history.

(56) References Cited

U.S. PATENT DOCUMENTS 5,684,791 A * 11/1997 Raychaudhuri ........ H04B 7/212
2002/0004842 A1 * 1/2002 Ghose ..................... G06F 15/16
(Continued)

FOREIGN PATENT DOCUMENTS

WO    2016003229 A1    1/2016

OTHER PUBLICATIONS

ISA/KR, "International Search Report and Written Opinion of the International Searching Authority," Application No. PCT/KR2017/013421, dated Feb. 23, 2018, 10 pages.
(Continued)

Primary Examiner — Ronald B Abelson

(57) ABSTRACT

The present disclosure discloses a method for performing a hybrid automatic repeat request (HARQ) feedback, method comprises: receiving data units; performing group bundling on the data units, wherein at least one data unit is bundled into more than one groups; determining, according to decoding results of the data units in each of the groups, ACK/NACK information of corresponding groups; feeding back ACK/NACK information of different bundled groups to the transmitter. Compared with the prior art, according to the present disclosure, a receiver performs grouping on data units in a way of overlapping bundling, group is used as a unit for feedback of ACK/NACK information, thus feedback overhead of HARQ feedback is reduced, data amount of HARQ-transmitter error retransmission is significantly (Continued)

reduced and efficiency of error retransmission is improved. In addition, the present disclosure further provides an HARQ retransmission method.

16 Claims, 7 Drawing Sheets

(51) Int. Cl.
*H04L 5/00* (2006.01)
*H04L 1/12* (2006.01)

(56) References Cited

U.S. PATENT DOCUMENTS

| | | |
|---|---|---|
| 2012/0002657 A1 | 1/2012 | Seyama et al. |
| 2016/0226643 A1 | 8/2016 | Mallik et al. |
| 2016/0233999 A1 | 8/2016 | Chendamarai Kannan et al. |
| 2017/0142593 A1 | 5/2017 | Seo et al. |

OTHER PUBLICATIONS

Mediatek Inc., "HARQ Enhancement for Improved Data Channel Efficiency," R1-162797, 3GPP TSG RAN WG1 Meeting #84bis, Busan, Korea, Apr. 11-15, 2016, 3 pages.

\* cited by examiner

Overlapping group bundling          Non-overlapping group bundling

METHOD AND APPARATUS FOR PERFORMING A HARQ FEEDBACK AND RETRANSMISSION

CROSS-REFERENCE TO RELATED APPLICATIONS

This application is a National Phase Entry of PCT International Application No. PCT/KR2017/013421, which was filed on Nov. 23, 2017, and claims priority to Chinese Patent Application No. 201611063615.4, which was filed on Nov. 25, 2016, the contents of which are incorporated herein by reference.

BACKGROUND

1. Field

A present disclosure relates to the technical field of wireless communication, and in particular to the method and the apparatus for performing the HARQ feedback and the retransmission.

2. Description of the Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Object of the present disclosure is to overcome shortcomings of the prior art and provide an HARQ feedback and retransmission method capable of reducing retransmitted data amount, and a receiver and transmitter.

In order to achieve the object, the present disclosure provides an HARQ feedback method, comprising the following steps of: receiving data units transmitted by a transmitter; performing group bundling on data units, and at least one data unit is bundled into more than one groups; determining, according to coding results of data units in each group, ACK/NACK information of corresponding groups; and feeding back ACK/NACK information of different bundled groups to the transmitter.

Preferably, before the step of performing group bundling on data units, the method further comprises: determining, in a way of receiving and/or reading, a method of group bundling of data units.

Preferably, the step of determining, in a way of receiving, a method of group bundling of data units comprises: acquiring, through received common signaling or user specific signaling, the parameters for group bundling, and determining, according to the relevant parameter of group bundling, the method of group bundling of data units.

Preferably, the step of determining, in a way of reading, a method of group bundling of data units comprises: reading the pre-determined rule in consensus with the transmitter, and determining, according to the pre-determined rule, the method of group bundling of data units.

Preferably, the step of determining, in a way of receiving and reading, a method of group bundling of data units comprises: acquiring, through received common signaling or user specific signaling, the parameters for group bundling; reading the pre-determined rule in consensus with the transmitter; determining, according to the relevant parameter of group bundling and the pre-determined rule, the method of group bundling of data units.

Preferably, the step of performing group bundling on data units, and at least one data unit is bundled into more than one groups comprises: performing group bundling on data units, and adjacent groups, among groups after being ranked, contains at least one same data unit.

Preferably, the step of performing group bundling on data units, and at least one data unit is bundled into more than one groups comprises: performing group bundling after ranking and indexing data units, wherein, indices of data units bundled to one same group is non-adjacent, and at least one data unit is bundled into more than one groups.

Preferably, the index interval of data units with non-adjacent indices is identical.

Preferably, the number of bundled groups is N, and the numbers of data units bundled in at least N–1 groups are same.

Preferably, the step of determining, according to decoding results of data units in each group, ACK/NACK information of corresponding groups comprises: if all the data units in one group are decoded correctly, the ACK/NACK information of the group is ACK, if not, the ACK/NACK information of the group is NACK.

Preferably, the step of feeding back ACK/NACK information of different bundled groups to the transmitter comprises: feeding back, in a way of mapping ACK/NACK information of groups each to specified resource location of radio frame, ACK/NACK information of different bundled groups to the transmitter.

In order to achieve the object, the present disclosure further provides an HARQ retransmission method, comprising the following steps of: receiving, from a receiver, ACK/NACK information of different bundled groups; determining, according to the obtained method of group bundling, indices of data units bundled in each group, where the method of group bundling includes a way that at least one data unit is bundled into more than one groups; determining, according to the ACK/NACK information of different bundled groups, retransmitted data units in each group; and transmitting the retransmitted data units to the receiver.

Preferably, the determined method of group bundling comprises: determining, in a way of receiving and/or reading, a method of group bundling of data units.

Preferably, the step of determining, in a way of receiving, a method of group bundling of data units comprises: acquiring, through received common signaling or user specific signaling, the parameters for group bundling, and determining, according to the relevant parameter of group bundling, the method of group bundling of data units.

Preferably, the step of determining, in a way of reading, a method of group bundling of data units comprises: reading the pre-determined rule in consensus with the receiver, and determining, according to the pre-determined rule, the method of group bundling of data units.

Preferably, the step of determining, in a way of receiving and reading, a method of group bundling of data units comprises: acquiring, through received common signaling or user specific signaling, the parameters for group bundling; reading the pre-determined rule in consensus with the receiver; determining, according to the relevant parameter of group bundling and the pre-determined rule, the method of group bundling of data units.

Preferably, the step of determining, according to the ACK/NACK information of different bundled groups, retransmitted data units among data units bundled in corresponding groups comprises: as for groups that the ACK/NACK information is NACK, determining the bundled data units, which are different with the data units being decoded correctly, as retransmitted data units, and the data units being decoded correctly contain all the data units bundled in the groups that the ACK/NACK information is ACK.

Preferably, the step of transmitting the retransmitted data units to the receiver comprises: transmitting, in a way of mapping the retransmitted data units to specified resource location of radio frame, the retransmitted data units to the receiver.

Preferably, the step of transmitting the retransmitted data units to the receiver further comprises: transmitting, on a control channel or traffic channel of the radio frame, index information of retransmitted data units to the receiver.

In order to achieve the object, the present disclosure further provides a receiver for HARQ feedback, comprising: a data receiving module configured to receive data units transmitted by a transmitter; a group bundling module configured to perform group bundling on data units, and at least one data unit is bundled into more than one groups; an error determining module configured to determine, according to decoding results of data units in each group, ACK/NACK information of corresponding groups; and an error feedback module configured to feed back ACK/NACK information of different bundled groups to the transmitter.

In order to achieve the object, the present disclosure further provides a transmitter for HARQ retransmission, comprising: an error receiving module configured to receive, from a receiver, ACK/NACK information of different bundled groups; a group unbundling module configured to determine, according to the determined method of group bundling, data units bundled in corresponding groups, and the method of group bundling comprises a way that at least one data unit is bundled into more than one groups; a retransmitted data determining module configured to determine, according to the ACK/NACK information of different bundled groups, retransmitted data units among data units bundled in corresponding groups; and a retransmission module configured to transmit the retransmitted data units to the receiver.

Compared with the prior art, the technical effects of the present disclosure include but not limited to:

1. A receiver performs group bundling on data units. Since group is used as a unit for feedback of ACK/NACK information, feedback overhead of HARQ feedback is significantly reduced.

2. A transmitter determines, according to grouping ACK/NACK information fed back by a receiver, transmission data units. Since there are overlapping data units bundled in adjacent groups, the set of data units being required to be retransmitted by the transmitter is a subset of group, data amount of HARQ error retransmission is significantly reduced and efficiency of error retransmission is improved.

3. A receiver performs group bundling on data units in a discrete way, which can provide more freedom degree of group bundling and balance total decoding error probability of each group, thus probability that NACK information being fed back by a single group is reduced, and retransmitted data amount of a transmitter is further reduced.

BRIEF DESCRIPTION OF THE DRAWINGS

In order to more clearly illustrate the technical solutions of the embodiments of the present disclosure, the drawings used in description of the embodiments will be briefly described as follows. Obviously, the following drawings described are merely some embodiments of the present disclosure. For those skilled in the art, other drawings can be obtained according to these drawings without the exercise of inventive faculty.

DETAILED DESCRIPTION

Technical solutions of the present disclosure will be explained clearly and completely below with reference to the attached drawings in the embodiments of the present disclosure in order for those skilled in the art to well understand the technical solutions of the present disclosure.

In the description, claims and some processes described in the above drawings, more than one operations appeared in a particular order are included. It should be understood that these operating may not be executed in the order described in the text or executed in parallel. The operation sequence numbers, such as 101 and 102, are merely used for distinguishing different operating, and the sequence number itself does not represent any execution order. In addition, these processes can comprise more or less operating, and these operating can be executed in an order or executed in parallel. It should be noted, the description such as "first" and "second" is used for distinguishing different information, devices, and modules or others, which does not represent the sequential order and define that "first" and "second" are different types.

Technical solutions of the present disclosure will be explained clearly and completely below with reference to the attached drawings in the embodiments of the present disclosure. Obviously, the described embodiments are merely a portion of the embodiments of the present disclosure, and are not all the embodiments. Based on the embodiments of the present disclosure, all the other embodiments obtained, on the premise that those skilled in the art do not apply inventive skills, belong to the protective scope of the present disclosure.

Figure 1:
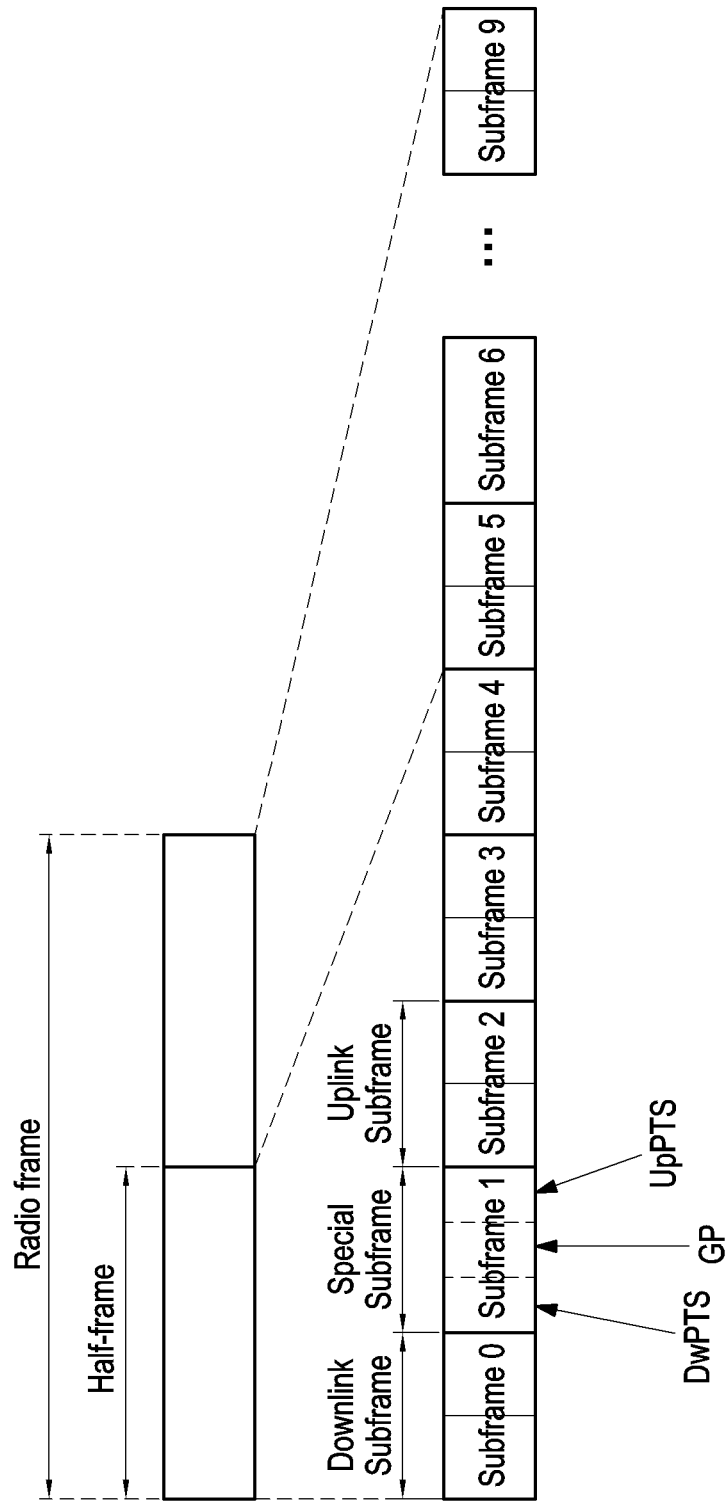
FIG. 1 is a schematic diagram of a TDD frame structure according to the Background Art of the present disclosure.

LTE (Long Term Evolution) technology supports two duplex modes of FDD (Frequency Division Duplex) and TDD (Time Division Duplex). Both the frame structures of the two duplex modes are frame structures using radio frame as unit, the length of each radio frame is 10 ms, and each radio frame contains 10 subframes that the length is 1 ms. As for TDD, it is determined, by uplink/downlink configuration parameters of a base station, that each subframe within one radio frame is configured to uplink transmission or downlink transmission, and subframes for unlink/downlink within each radio frame are fixed. As for FDD, uplink transmission and down transmission belong to different frequency bands respectively, thus each subframe can be configured to uplink transmission and downlink transmission at the same time, which can be specifically determined by scheduling dynamic state of a base station. FIG. 1 provides a schematic diagram of a TDD frame structure.

The basic unit used by a base station for uplink/downlink transmission is subframe, and TB (Transmission Block), after being coded and modulated, is mapped to a scheduled subframe. As for wireless communication, a certain probability of error will occur in data transmission, thus it is required to inform, at a receiver (the receiver is a base station during uplink transmission, and the receiver is a terminal during downlink transmission), a transmitter (the transmitter is a terminal during uplink transmission, and the transmitter is a base station during downlink transmission) of result of bit check of a decoding module. If the decoding result is correct, ACK information is fed back; if not, NACK information is fed back. When a transmitter receives NACK information, it is required to retransmit decoding-failed data, and a receiver combines the retransmitted data with the transmission-initial data to enhance equivalent demodulation SNR (Signal to Noise Ratio), thus the probability that data blocks are correctly decoded is improved. This technology is referred to as HARQ (Hybrid Automatic Repeat Request) technology.

As for LTE TDD, since the occasion of uplink/downlink transmission is constrained by uplink/downlink subframe configuration, if the uplink/downlink subframes are unbalanced in distribution, this may lead to a fact that after data transmission, a plurality of ACK/NACK information cannot be fed back in time for a while, thus the subsequent scheduling and transmission are affected. With respect to downlink ACK/NACK feedback of uplink transmission, this problem more affects uplink ACK/NACK feedback of downlink transmission, because it will affect wireless resource scheduling of a base station when the base station cannot receive the feedback, from a terminal, of ACK/NACK information. In the technologies that have been disclosed, for uplink ACK/NACK feedback of downlink transmission, LTE TDD uses two modes of ACK multiplexing and ACK bundling to solve the above problem, and a base station can perform configuration through higher layer signaling, so as to select one mode to perform ACK/NACK feedback for a terminal.

ACK/NACK multiplexing refers to that a terminal transmits, on a same uplink subframe, uplink ACK/NACK feedback information of a plurality of downlink subframes, and different ACK/NACK information can be born through different uplink physical channel or be distinguished by using different time-frequency resource locations within a same subframe. Certainly, ACK/NACK multiplexing can ensure simultaneous feedback of a plurality of ACK/NACK information, but more feedback overhead is required to be occupied.

Figure 2:
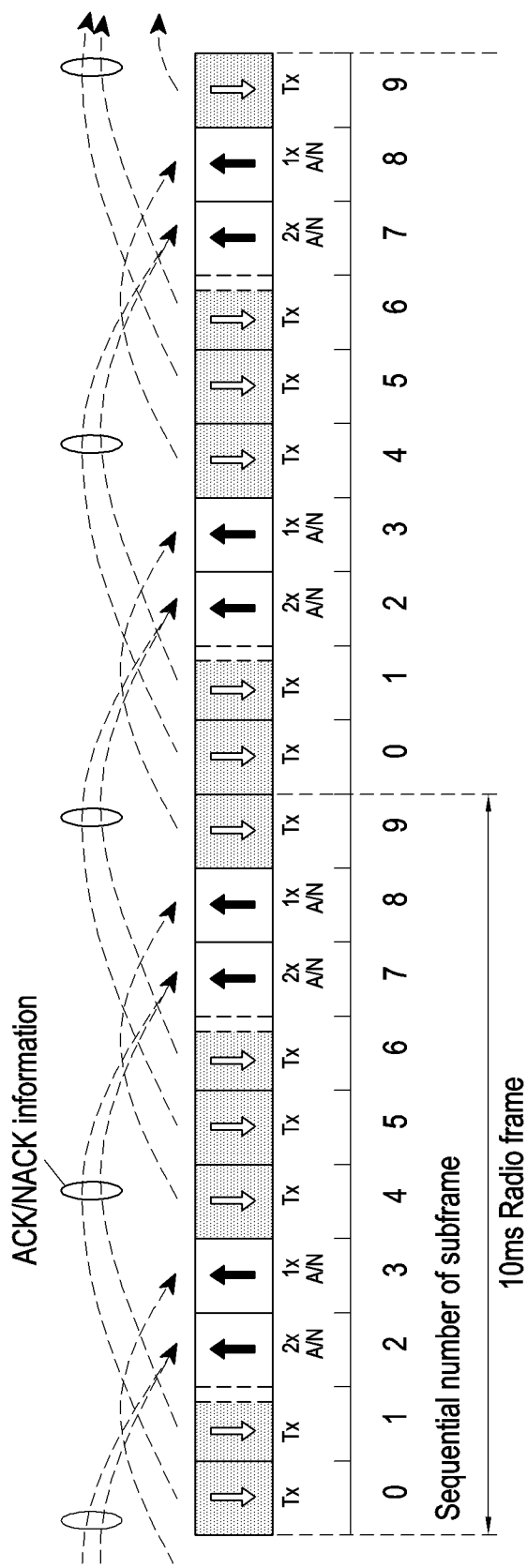
FIG. 2 is a schematic diagram of LTE ACK/NACK bundling feedback according to Background Art of the present disclosure.

Basic idea of ACK/NACK bundling is to combine ACK/NACK information of a plurality of subframes and then transmit. Only when all the received subframes are decoded correctly, ACK information is feedback; if not, NACK information is feedback; which can be seen in FIG. 2. The current bundling way is that ACK/NACK feedback of several consecutive subframes is bundled into one group, each bundled group is not overlapped to each other, and error probability is independent to each other. When a transmitter cannot distinguish, after receiving NACK information, respective ACK/NACK feedback of a plurality of subframes in a bundled group, the data of all the subframes in the bundled group must be retransmitted. Therefore, although ACK/NACK bundling can significantly save resource required by feedback, but it can also increase the probability and data amount of error retransmission at the same time. It is required to consider rational bundling way to decrease data amount of retransmission.

In view of this, it would be desirable to provide an HARQ feedback and retransmission method, receiver and transmitter which are capable of solving the above technical problems.

Data units of the present disclosure refer to data blocks independently determining ACK/NACK information, for example, Transmission Block (TB) or Code Block (CB), etc.

Figure 3A:
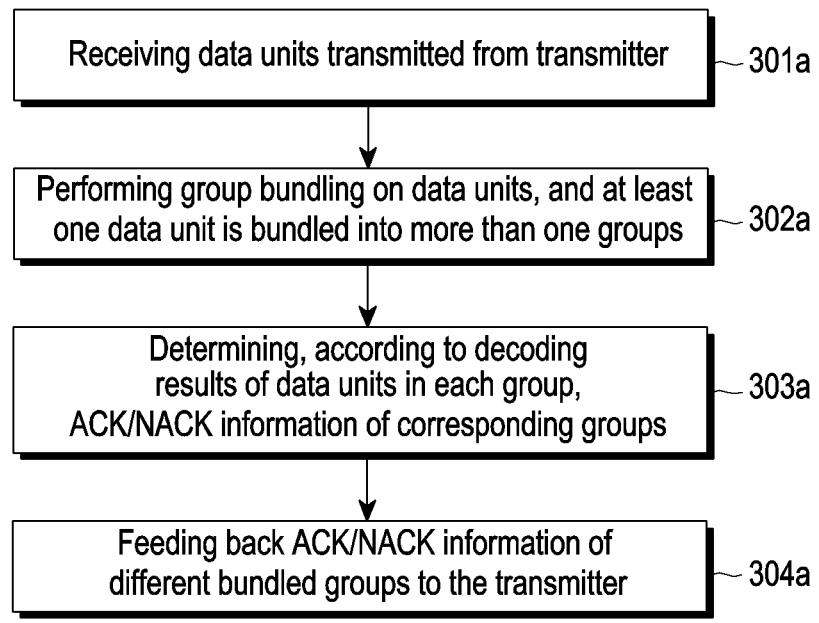
FIG. 3A and FIG. 3B is a flowchart of an HARQ feedback method according to the present disclosure.
Figure 3B:
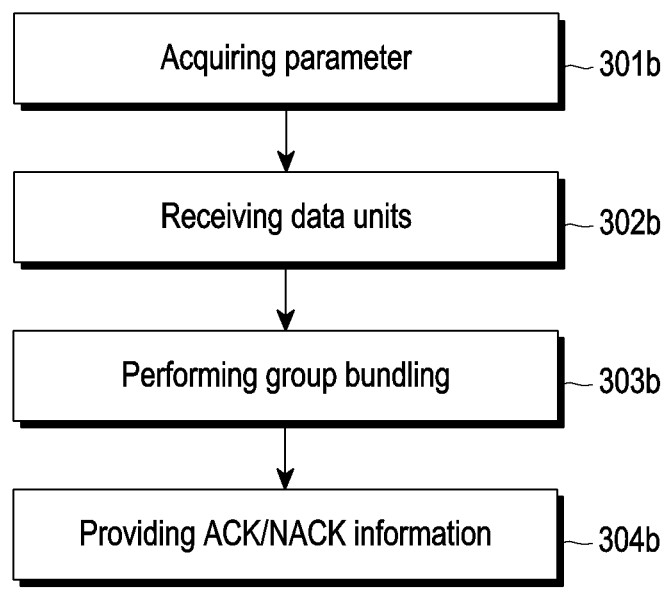

As shown in FIGS. 3A and 3B, the HARQ feedback method comprises the following steps of:

Step 301a: Receiving data units transmitted from a transmitter.

Step 302a: Performing group bundling on the data units, wherein at least one data unit is bundled into more than one groups.

Step 303a: Determining, according to decoding results of the data units in each group, ACK/NACK information of corresponding the groups.

Step 304a: Feeding back ACK/NACK information of different bundled groups to the transmitter.

Embodiment 1

Taking uplink feedback (receiver is terminal, and transmitter is base station) of downlink transmission as an example below, an embodiment of an HARQ feedback method of the present disclosure is provided. It is to be noted that the HARQ feedback method of the present disclosure can also be used in a scene of downlink feedback of uplink transmission (receiver is base station, and transmitter is terminal).

Step 301*b*: Acquiring, by a terminal and through received common signaling or user specific signaling, the parameters for group bundling, and/or reading the pre-stored pre-determined rule with a base station, and determining, according to the relevant parameter of group bundling and the pre-determined rule, the method (or type) of group bundling of data units.

The rule in consensus with the transmitter can be determined by the terminal, and the terminal can acquire the pre-determined rule in a way of reading. The terminal can acquire the relevant parameter of group bundling through receiving an explicit notification or implicit notification.

The explicit notification refers to parameters, which is included in the relevant parameter of group bundling, directly indicating the way of bundling of data units such as group size (number of data units bundled in group), discrete interval number (index interval number of the adjacent data units in the data units after being ranked and indexed, that is, it is consecutive bundling when the discrete interval number is 0) and overlapping size (number of overlapping data units of adjacent groups). For example, the base station individually indicates, in a user specific signaling, relevant parameters of group bundling such as group size, discrete interval number and overlapping size, which are adopted by each base station.

Under a situation of explicit notification, the base station requires more bits to indicate each detail parameter in the method (or type) of group bundling, which will cause larger signaling overheads. The more the total number of bits of ACK/NACK information fed back by the terminal is, the situation of group bundling is more complicated, the number of bits requiring an explicit notification is more and the signaling overheads are larger. In order to decrease signaling overheads, certain pre-determined rules (between the base station and the terminal) can be made in a communication system, so as to replace a portion of relevant parameters of group bundling, thus only other unknown parameters for group bundling is required to be included in the signaling of the explicit notification. Although signaling overheads can be decreased in this way, selection freedom degree of method of group bundling will be limited. For example, a system rule limits that each terminal performs consecutive group bundling, in a way of equal division, on data units, and a fixed number of overlapping units is maintained between adjacent groups. At this time, the base station is only required to broadcast, in a common signaling, two parameters: group size (it can be provided in the rule that size of the last group is less than or equal to configuration parameter of group size, so as to be applicable to a situation that total number of data units cannot be divided equally according to the configured group size) and overlapping size, which can be used for ACK/NACK information feedback of all the terminals of the entire cell.

TABLE 1

Examples illustrating ways of group bundling of data units

| Indices of methods of group bundling | Methods of group bundling | Examples (user has 7 data units) |
|---|---|---|
| 0 | Discrete interval number is 0, group size is 3 (the last group is allowed to be less than or equal to 3), and overlapping size is 1 | Group 1: unit 1 + unit 2 + unit 3<br>Group 2: unit 3 + unit 4 + unit 5<br>Group 3: unit 5 + unit 6 + unit 7 |
| 1 | Discrete interval number is 0, group size is 3 (the last group is allowed to be less than or equal to 3), and overlapping size is 0 | Group 1: unit 1 + unit 2 + unit 3<br>Group 2: unit 4 + unit 5 + unit 6<br>Group 3: unit 7 |
| 2 | Discrete interval number is 2, group size is 3 (the last group is allowed to be less than or equal to 3), and overlapping size is 1 | Group 1: unit 1 + unit 3 + unit 5<br>Group 2: unit 5 + unit 7 + unit 2<br>Group 3: unit 2 + unit 4 + unit 6 |
| 3 | Discrete interval number is 2, group size is 3 (the last group is allowed to be less than or equal to 3), and overlapping size is 0 | Group 1: unit 1 + unit 3 + unit 5<br>Group 2: unit 7 + unit 2 + unit 4<br>Group 3: unit 6 |

Implicit notification refers to that relevant parameter of group bundling does not contain parameter indirectly indicating method of group bundling of data units, only contain parameter supplementarily indicating a method of group bundling of data units. Under a situation of way of implicit notification, there must be certain pre-determined rules in a communication system (between a base station and a terminal). For example, as shown in Table 1, there is pre-determined index correspondence of a method of group bundling of data units in a system rule. A base station transmits, through common signaling or user specific signaling, index (that is, parameter supplementarily indicating a method of group bundling of data units) of a method of group bundling to a terminal, and the terminal determines, by lookup table, the method (or type) of group bundling.

With respect to explicit notification, the adoption of implicit notification can further decrease signaling overheads of base station, and a method of group bundling having greater freedom can be implemented through designing an appropriate system rule. For example, one kind of implicit notification allows that a unique method of group bundling is co-determined by the total bit number of ACK/NACK information fed back by the terminal and the total number of data units; the base station configures, through user specific signaling, the total bit number (that is, that is, parameter supplementarily indicating a method of group bundling of data units) of ACK/NACK information fed back by the terminal, and the terminal looks up a comparison table according to the received data units to determine the method of group bundling. Table 2 is an example of comparison table.

TABLE 2

Examples illustrating comparison of ways of group bundling of implicit notification

|  | Total number of bits of ACK/NACK information is 1 | Total number of bits of ACK/NACK information is 2 | Total number of bits of ACK/NACK information is 3 | Total number of bits of ACK/NACK information is 4 |
|---|---|---|---|---|
| Total number of data units is 4 | Group 1: unit1 + unit2 + unit3 + unit4 | Group 1: unit1 + unit2; Group 2: unit3 + unit 4 | Group 1: unit1 + unit2; Group 2: unit2 + unit3; Group 3: unit4 | Group 1: unit1; Group 2: unit2; Group 3: unit3; Group 4: unit4 |
| Total number of data units is 5 | Group 1: unit1 + unit2 + unit3 + unit4 + unit5 | Group 1: unit1 + unit2 + unit3; Group 2: unit3 + unit4 + unit5 | Group 1: unit1 + unit2; Group 2: unit2 + unit3; Group 3: unit4 + unit5 | Group 1: unit1 + unit2; Group 2: unit2 + unit3; Group 3: unit4; Group 4: unit5 |
| Total number of data units is 6 | Group 1: unit1 + unit2 + unit3 + unit4 + unit5 + unit6 | Group 1: unit1 + unit2 + unit3; Group 2: unit4 + unit5 + unit6 | Group 1: unit1 + unit2; Group 2: unit3 + unit4; Group 3: unit5 + unit6 | Group 1: unit1 + unit2; Group 2: unit2 + unit3; Group 3: unit4 + unit5; Group 4: unit5 + unit6 |

Step 302b: Receiving, by a terminal, data units transmitted by a base station.

Step 303b: Performing, by the terminal and according to a method (or type) of group bundling of data units, group bundling on the received data units, and determining ACK/NACK information of corresponding groups.

A terminal performs group bundling on data units $a_i$ (i=1, ..., M), where M is the number of data units in transmitting data. $A_i=\{a_{i1}, \ldots, a_{ik}\}$ is assumed to be the $i^{th}$ group, and k is the number of data units bundled in the $i^{th}$ group. That is, k is the group size of the $i^{th}$ group, and the group size of each group can be different, so as to adapt diversity of different number of data units and different group situations. $\{a_{i1}, \ldots, a_{ik}\}$ add is a data unit bundled in the $i^{th}$ group, if and only if the $\{a_{i1}, \ldots, a_{ik}\}$ are all decoded correctly, the terminal determines that the ACK/NACK information of the group $A_i$ is ACK, if not, determines that the ACK/NACK information of the group $A_i$ is NACK. All the groups of group bundling result are assumed to be $\{A_1, \ldots, A_B\}$, since ACK/NACK information of each group occupies one bit, thus B is the total number of bits of ACK/NACK information fed back by the terminal. Group bundling should satisfy $\cup_{i=1 \ldots B} A_i = \{a_j/j=1, \ldots, M\}$, that is, the group scope covers all the data units. Hereinafter, overlapping group bundling and discrete group bundling will be described in detail.

Overlapping group bundling, that is, there is i≠j that enables $A_i \cap A_j \neq 0$ (set $A_i \cap A_j$ can characterize overlapping degree of group), and there are several same data units in the two groups at the same time. If there is $A_i \cap A_j = 0$ as for any i≠j, which is non-overlapping group bundling. That is, same data units are not included in both of the any group. It can be regarded as a particular case of overlapping group bundling having the minimum overlapping degree. Compared with non-overlapping group bundling, overlapping group bundling can enable there is correlation between the ACK/NACK information fed back by the terminal, this correlation can help the base station to decide correctness of decoding of single data unit in a group, thus data amount of retransmission of the base station is decreased. According to signaling indication, the terminal, after acquiring parameters (for example, overlapping size) about overlapping group bundling, can perform overlapping group bundling. For example, configuration information of a method of group bundling acquired by the terminal is "consecutive bundling, two data units are bundled into one group, and one data unit is overlapped between adjacent groups" (can be acquired according to "discrete interval number", "group size" and "overlapping size"), and when the terminal performs group bundling on three data units, the group bundling results namely is $A_1=\{a_1,a_2\}$ and $A_2=\{a_2,a_3\}$.

As for discrete group bundling, that is, in $A_i=\{a_{i1}, \ldots, a_{ik}\}$, $i_p \neq i_1+(p-1)$, p≤k, it follows that, data unit index in one group is inconsecutive. As for consecutive group bundling, that is, in $A_i=\{a_{i1}, \ldots, a_{ik}\}$, $i_p=i_1+(p-1)$, p≤k, it follows that, data unit index in one group is consecutive, which can be regarded as a particular case of discrete group bundling. Consecutive/discrete group bundling and overlapping group bundling are not mutually exclusive, and both belong to relevant parameter of group bundling. As for the above cases, when being configured as discrete group bundling, one group result is $A_1=\{a_1,a_3\}$ and $A_2=\{a_2,a_3\}$. Compared with consecutive group bundling, discrete group bundling provides more freedom degree of group bundling, but more signaling overheads are required to indicate relevant parameter.

Figure 4:
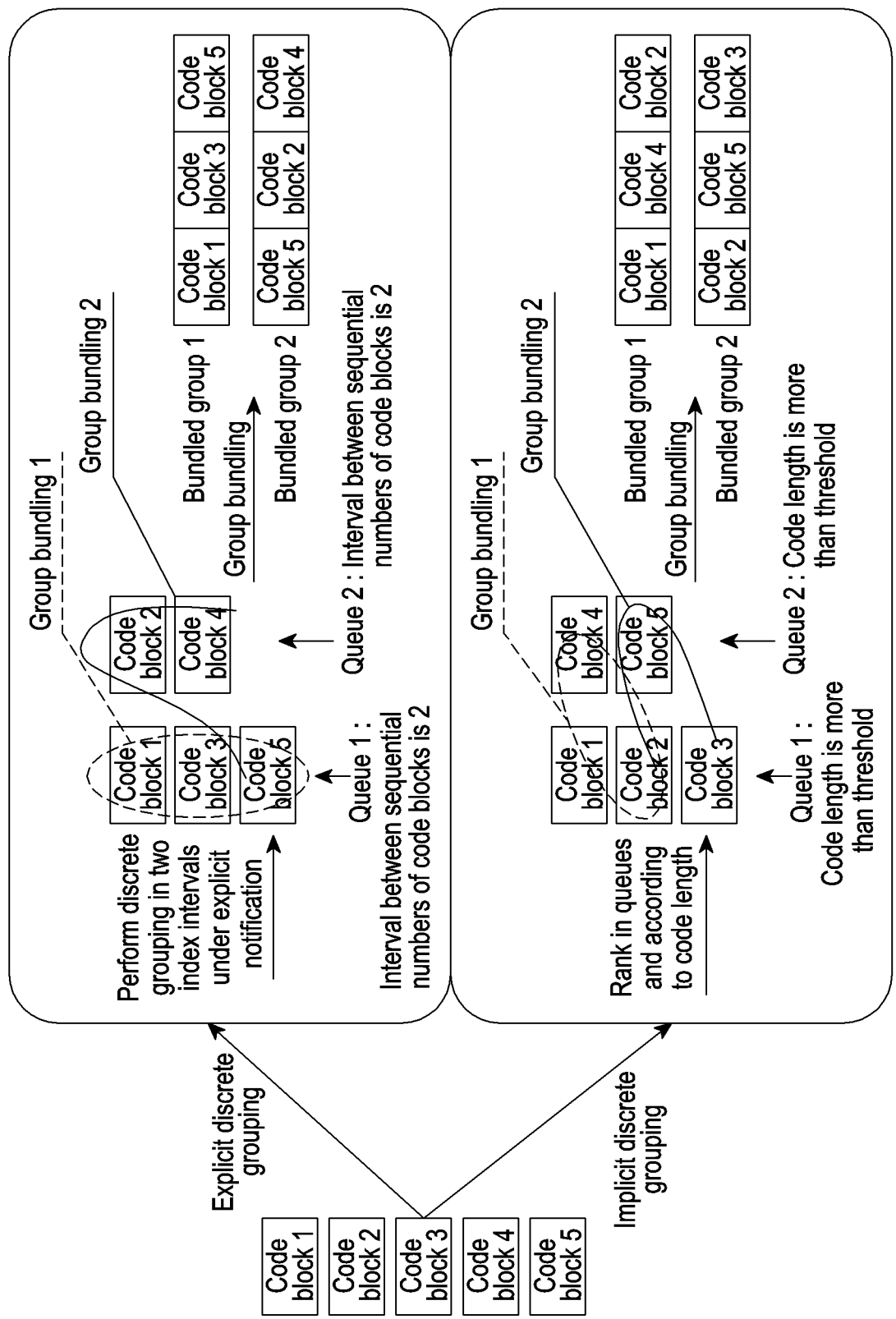
FIG. 4 is a schematic diagram of an implementation process of discrete group bundling according to Embodiment 1 of the present disclosure.

Relevant parameter of discrete group bundling can be transmitted to the terminal by explicit notification or by implicit notification. FIG. 4 provides transmission of relevant parameter of discrete group bundling respectively using an explicit notification and an implicit notification, and provides an example of discrete group bundling and overlapping group bundling on five data units, wherein the code block namely is a data unit of the present disclosure. Hereinafter, the implementation process of discrete group bundling under the two notification ways will be described in detail and in combined with FIG. 4. Firstly, the configuration information of a method (or type) of group bundling acquired by the terminal is "three code blocks are bundled into one group and there is one code block between adjacent groups is overlapped".

Under a way of explicit notification, the base station notices, through common signaling or user specific signaling, that the discrete interval number of relevant parameter of group bundling is 2, and divides, according to interval indication, the code blocks into two queues which are not overlapping each other and are consistent in index interval. For the convenience of description, the code blocks in each queue are ranked in increasing order. Firstly, first three code blocks in queue 1 are extracted as a first group, and the last code block of the first group serves as the start code block of a second group. The data units of the first queue are extracted in increasing order until the data units in the first queue are extracted completely, and later the data units of the second queue are extracted in the same order. The result of group bundling is as shown in FIG. 4. When there are more than one code blocks or queues (number of queues is same as the configured discrete interval number), the result of group bundling is obtained by analogy according to the above process.

Under a way of implicit notification, it can be coordinated in the system rule that a queue is ranked according to code length. Coded blocks with shorter code length are discreted into each group for bundling and feeding back ACK/NACK information, in order to balance error probability of each group. The base station notices, through common signaling or user specific signaling, that the code length threshold (that is, parameter that supplementarily indicating a method of group bundling of data units) of relevant parameter of group bundling is 1. The terminal divides, according to the code length threshold, code blocks into two queues, wherein the code blocks that the code length is greater than the code length threshold is used as a first queue, and the code blocks that the code length is less than the code length threshold is used as a second queue. For the convenience of description, the code blocks in each queue are ranked in increasing order. During group bundling, code blocks in different queues are extracted in turn as one group, and the last code block of a previous group serves as the start code block of a next group until all the code blocks are extracted during the group bundling. The result of group bundling is as shown in FIG. 4. Similarly, when there are more than one code blocks or queues (number of queues is determined by the number of the configured code length threshold), the result of group bundling is obtained by analogy according to the above process.

It is to be noted that, through a proper design, the present disclosure can also allow a receiver to adaptively determine a method of group bundling of data units, thus the adaptive configuration between overlapping group bundling and non-overlapping group bundling and the adaptive configuration between discrete group bundling and consecutive group bundling are implemented. When it is configured adaptively, the system provides an adaptively configured rule for the base station and terminal, and the base station notices, through signaling, relevant parameter (parameter that supplementarily indicating a method of group bundling of data units) of group bundling, in order to assist the terminal to determine a unique method of group bundling according to its own conditions. Wherein, parameter of group bundling can be noticed by common signaling to be carried in broadcast information or system information, or can also be noticed by user specific signaling. That is, it is allowed to configure different ways of group bundling for different terminals.

As for the adaptive configuration between overlapping group bundling and non-overlapping group bundling, for example, the system can provide when the number of the received data units can be divisible by the total number of bits of ACK/NACK information fed back, group bundling is performed in a non-overlapping way, if not, group bundling is performed in an overlapping way. At this time, the base station can notice the total number of bits of ACK/NACK information fed back through broadcast of system, and as for uplink feedback of downlink transmission, the terminal can adaptively obtain a proper method of group bundling according to number of data units of downlink transmission. Similarly, as for downlink feedback of uplink transmission, the base station can also adaptively obtain a proper method of group bundling according to number of data units of uplink transmission.

As for the adaptive configuration between discrete group bundling and consecutive group bundling, for example, the system can provide when the maximum difference of the equivalent code rates (which can be obtained by computation according to information such as number of bits of data units, a way of modulation, and size of resource blocks assigned by the base station for transmission of the data units; and all the information can be determined in a process scheduled by the base station and notice, through a downlink control channel, to the terminal) of data units is less than a threshold value, it shows the decoding performance of data units is approximate, group bundling is performed in a consecutive way, if not, group bundling is performed in a discrete way. As for uplink feedback of downlink transmission, the terminal can adaptively obtain a proper method of group bundling according to number of data units of downlink transmission. Similarly, as for downlink feedback of uplink transmission, the base station can also adaptively obtain a proper method of group bundling according to number of data units of uplink transmission. The threshold value can be noticed by the base station through broadcast message. For example, when the threshold value that the system broadcasts is 0.1, if the maximum equivalent code rate of the data unit received by certain terminal is 0.9, and the minimum equivalent code rate is 0.4, then the maximum difference of the code rates is 0.5, which is less than the threshold value, thus the terminal can adaptively adopt discrete group bundling.

Step 304b: Providing, by the terminal and in a way of mapping ACK/NACK information of groups each to specified resource location of radio frame, ACK/NACK information of different bundled groups to the transmitter.

It is to be noted that, in the example of the HARQ feedback method in the present disclosure that is used in a scene of downlink feedback of uplink transmission, the base station, as a receiver, receives uplink data transmitted by the terminal, and performs group bundling, according to the pre-determined system rule and/or relevant parameter of group bundling that is broadcasted or configured by the base station, on the received uplink data, determines ACK/NACK information of each group, and provides the corresponding terminal with the ACK/NACK information.

Figure 5:
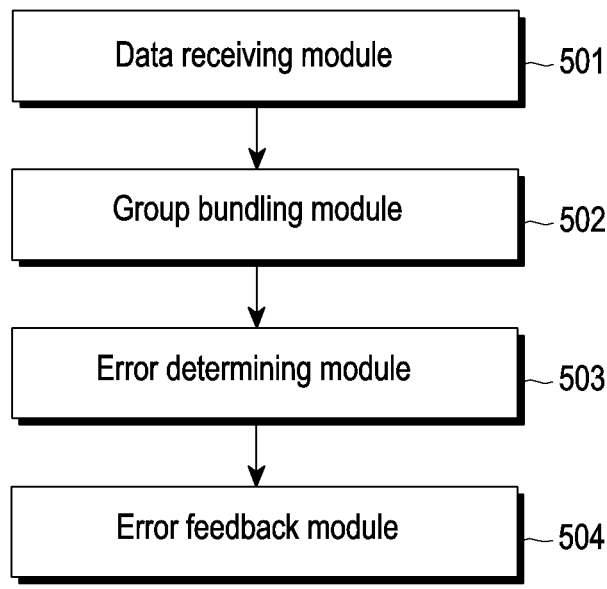
FIG. 5 is a module block diagram of a receiver for HARQ feedback according to the present disclosure.

As shown in FIG. 5, the receiver for HARQ feedback of the present disclosure comprises:

a data receiving module (501) configured to receive data units transmitted by a transmitter;

a group bundling module (502) configured to perform group bundling on data units, and at least one data unit is bundled into more than one groups;

an error determining module (503) configured to determine, according to decoding results of data units in each group, ACK/NACK information of corresponding groups;

an error feedback module (504) configured to feed back ACK/NACK information of different bundled groups to the transmitter.

The working processes of the data receiving module, group bundling module, error determining module, error feedback module respectively correspond to Steps 301a, 302a, 303a and 304a of the HARQ feedback method in the present disclosure, and will not be repeated herein.

Figure 6A:
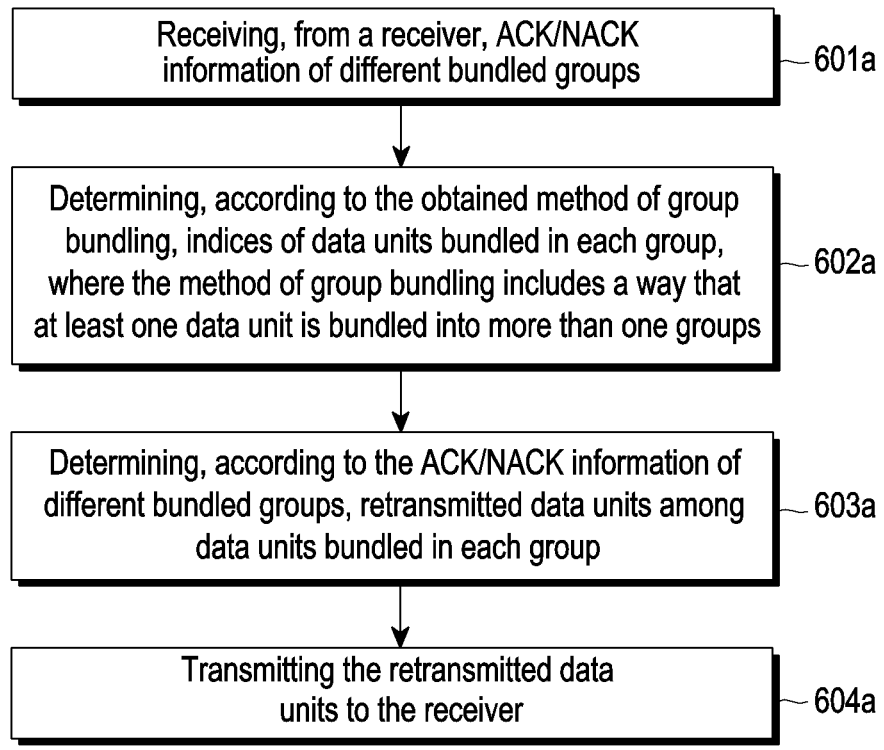
FIG. 6A and FIG. 6B is a flowchart of an HARQ retransmission method according to the present disclosure.
Figure 6B:
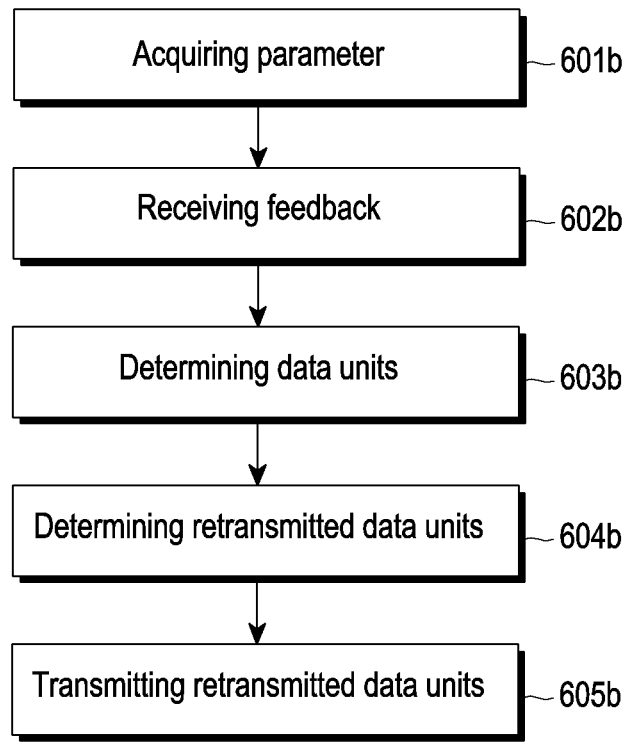

As shown in FIGS. 6A and 6B, the HARQ retransmission method of the present disclosure comprises the following steps of:

Step 601a: Receiving, from a receiver, ACK/NACK information of different bundled groups.

Step 602a: Determining, according to the obtained method (or type) of group bundling, indices of data units bundled in each group, where the method (or type) of group bundling includes a way that at least one data unit is bundled into more than one groups.

Step 603a: Determining, according to the ACK/NACK information of different bundled groups, retransmitted data units (or data units to be retransmitted) among data units bundled in each group.

Step 604a: Transmitting the retransmitted data units (or data units to be retransmitted) to the receiver.

Embodiment 2

Taking error retransmission (transmitter is base station, and receiver is terminal) of downlink transmission as an example below, an embodiment of an HARQ retransmission method of the present disclosure is provided. It is to be noted that the HARQ retransmission method of the present disclosure can also be used in a scene of error retransmission of uplink transmission (transmitter is terminal, and receiver is base station).

Step 601b: Acquiring, by a base station, through received common signaling or user specific signaling, the parameters for group bundling, and/or reading the pre-stored pre-determined rule with a terminal, and determining, according to the relevant parameter of group bundling and the pre-determined rule, the method (or type) of group bundling of data units.

The rule in consensus with the base station can be pre-stored in the terminal, and the base station can acquire the pre-determined rule in a way of reading. The base station can acquire the relevant parameter of group bundling through receiving an explicit notification or implicit notification. Wherein, the specific contents of the explicit notification, implicit notification and determination of the method (or type) of group bundling of data units are same with Step 301b of Embodiment 1, and will not be repeated herein.

Step 602b: Receiving feedback, by the base station and from the terminal, of ACK/NACK information of different bundled groups.

Step 603b: Determining, by the base station and according to the method (or type) of group bundling of data units, data units bundled in corresponding groups.

The process of the determining, by the base station and according to the method (or type) of group bundling of data units, data units bundled in corresponding groups is similar as the process of the performing, by the terminal, group bundling on data units. The specific contents can be seen in the Step 303b of Embodiment 1, and will not be repeated herein.

Step 604b: Determining, by the base station and according to the ACK/NACK information of different bundled groups, retransmitted data units (or data units to be retransmitted) among data units bundled in corresponding groups.

The base station obtains ACK/NACK information of each data units according to ACK/NACK information of different bundled groups, thus the data units to be retransmitted are determined, and the implementation is as follows. Firstly, each data unit is searched by traversing by using data unit as unit, and when the ACK/NACK information of a group in which a data unit locates is ACK, the data unit is marked as a decoding-correct unit. When the ACK/NACK information of a group in which a data unit located is NACK, it is decided whether the data unit is same as the marked decoding-correct data unit, if it is, the data unit is marked as a decoding-correct unit, if not, the data unit is marked as a decoding-false unit and should be retransmitted. For example, when the number of data units is 3 and the method of group bundling is overlapping group bundling, the results of group bundling are $A_1=\{a_1,a_3\}$ and the data amount retransmitted by a base station corresponding to the grouping $A_2=\{a_2,a_3,a_4\}$, ACK/NACK information fed back by a terminal is as shown in Table 3. When the ACK/NACK information of A1 and A2 is different, retransmitted data unit is a subset of a group, and a base station is not required to retransmit all the data units of the whole group, thus data amount to be retransmitted is reduced.

TABLE 3

Examples of retransmitted data amount corresponding to grouping ACK/NACK information

| Grouping ACK/NACK information | Retransmitted data unit(s) |
|---|---|
| $A_1$ is ACK and $A_2$ is ACK | No |
| $A_1$ is ACK and $A_2$ is NACK | Unit 2 and unit 4 |
| $A_1$ is NACK and $A_2$ is ACK | Unit 1 |
| $A_1$ is NACK and $A_2$ is NACK | All the units |

Step 605b: Transmitting, by the base station and in a way of mapping the retransmitted data units to specified resource location of radio frame, the retransmitted data units to the terminal.

The index of retransmitted data units can be transmitted to the terminal in a way of implicit notification. For example, if the data units required to be retransmitted are the second data unit and the fourth data unit and multiplexing transmission is required to be performed on the second data unit and the fourth data on different time-frequency resource, and the system pre-determined rule is that data groups are ranked according to an index ascending order, thus the terminal can separate the data groups according to the orders of the data unit 2 and the data unit 4, and perform the subsequent processing. Or, if the data units required to be retransmitted are the second data unit and the fourth data unit but transmission is required on different time-frequency resource respectively, and the system pre-determined rule is that data units are retransmitted sequentially according to a data index ascending order, thus the terminal can receive the data unit 2 in an index-smaller frequency-domain resource block or in an index-smaller frame/subframe, and receive data unit 4 in an index-larger frequency-domain resource block or in an index-larger frame/subframe. The index of retransmitted data units can also be transmitted to the terminal in a way of explicit notification, for example, on a control channel of a retransmission subframe, or directly on a specified bit for data transmission on a service channel, the index for indication of retransmitted data units is carried by information.

It is to be noted that, in the example of the HARQ retransmission method of the present disclosure that is used in a scene of error retransmission of uplink transmission, the terminal, as a transmitter, receives the ACK/NACK information fed back by the base station, and determines, according to the pre-determined system rule and/or relevant parameter of group bundling that is transmitted by the base station and through common signaling or user specific signaling, situation of decoding error of each data unit, and retransmits the decoding-false data units to the base station.

Figure 7:
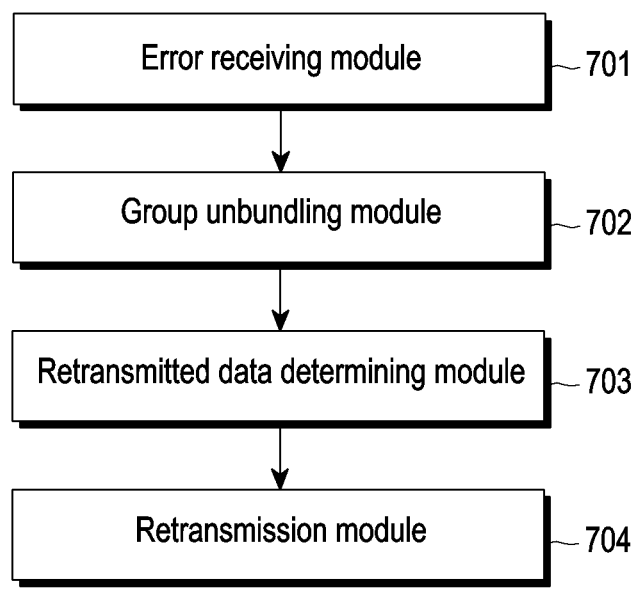
FIG. 7 is a module block diagram of a transmitter for HARQ retransmission according to the present disclosure.

As shown in FIG. 7, the transmitter for HARQ retransmission according to the present disclosure comprises:

an error receiving module (701) configured to receive, from a receiver, ACK/NACK information of different bundled groups;

a group unbundling module (702) configured to determine, according to the determined method (or type) of group bundling, data units bundled in corresponding groups, and the method of group bundling comprises a way that at least one data unit is bundled into more than one groups;

a retransmitted data determining module (703) configured to determine, according to the ACK/NACK information of different bundled groups, retransmitted data units among data units bundled in corresponding groups;

a retransmission module (704) configured to transmit the retransmitted data units to the receiver.

The working processes of the error receiving module, group unbundling module, retransmitted data determining module and retransmission module respectively correspond to Steps 601a, 602a, 603a and 604a of the method for HARQ retransmission according to the present disclosure, and will not be repeated herein.

Compared with the prior art, in the present disclosure, group bundling is performed on data units in a way of overlapping, number of bits transmitted by a transmitter for error is saved and system efficiency is greater improved. One example is provided as follows.

A given total number of bits of ACK/NACK information fed back by a single terminal is 3, and certain terminal has ACK/NACK information of seven code blocks to be fed back. All the data bit, code length and modulation coding way of each code block are assumed to be same, and thus bit error probability of more than one code blocks is same. Since bit error probability of more than one code blocks is same, consecutive group bundling can be adopted. Under the above basic assumption, the bit error probability is quantified to be 10% and 1% (10% and 1% are common bit error probability), and retransmission efficiency of overlapping group bundling and non-overlapping group bundling is compared.

Figure 8:
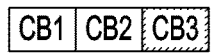
FIG. 8 is a schematic diagram of comparison between overlapping group bundling and non-overlapping group bundling according to the present disclosure.
Figure 8:
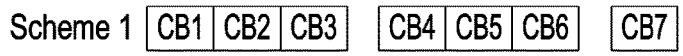
Figure 8:
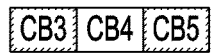
Figure 8:
Figure 8:

As shown in FIG. 8, size of each group is 3, and one code block unit between adjacent groups is overlapped. As for non-overlapping group bundling, number of code block and total number of bits for feedback of ACK/NACK information are given, in order to avoid an oversize group, size equilibrium shall be ensured as far as possible during bundling. Or else, a single group is larger, the entire decoding-false probability of the single group is higher, the single group generates NACK more easily, and data amount to be retransmitted by the base station is larger. According to the above analysis, schemes to be selected for non-overlapping group bundling have two, as shown in FIG. 8.

Thus, average retransmitted data amount of each method of group bundling can be obtained, comparison results of retransmitted data amount under situations of overlapping group bundling and non-overlapping group bundling is provided as follows, and the comparison results are presented in retransmission-saved data amount percentage (that is, (retransmitted data amount of non-overlapping group bundling-retransmitted data amount of overlapping group bundling)/retransmitted data amount of non-overlapping group bundling), as shown in Table 4.

TABLE 4

Comparison results between retransmitted data amount of overlapping scheme and retransmitted data amount of non-overlapping scheme

| | Error rate of a single code block is 10% | Error rate of a single code block is 1% |
|---|---|---|
| Overlapping scheme and non-overlapping scheme 1 | 16% | 21% |

TABLE 4-continued

Comparison results between retransmitted data amount of overlapping scheme and retransmitted data amount of non-overlapping scheme

| | Error rate of a single code block is 10% | Error rate of a single code block is 1% |
|---|---|---|
| Overlapping scheme and non-overlapping scheme 2 | 8% | 11% |

The comparison results shows, compared with conventional non-overlapping group bundling, overlapping group bundling significantly reduces retransmitted data amount and improves retransmission efficiency.

It can be seen in combination with the above detail description for the present disclosure, compared with the prior art, the present disclosure at least has the following beneficial technical effects:

1. A receiver performs group bundling on data units, since group is used as a unit for feedback of ACK/NACK information, and feedback overhead of HARQ feedback is significantly reduced.

2. A transmitter determines, according to grouping ACK/NACK information fed back by a receiver, transmission data units, since there are overlapping data units bundled in adjacent groups, the set of data units being required to be retransmitted by the transmitter is a subset of group, data amount of HARQ error retransmission is significantly reduced and efficiency of error retransmission is improved.

3. A receiver performs group bundling on data units in a discrete way, which can provide more freedom degree of group bundling and balance total decoding error probability of each group, thus probability that NACK information fed back by a single group is reduced, and retransmitted data amount of a transmitter is further reduced.

4. Relevant parameter of group bundling is transmitted in a way of explicit notification and implicit notification, the explicit notification is high in signaling overhead but also high in freedom degree, the implicit notification is low in signaling overhead but also low in freedom degree. Through selection of the explicit and the implicit, signaling overhead and freedom degree of group bundling can be designed properly after overall consideration, thus overall efficiency of a system is promoted.

5. Adaptive group bundling configuration is provided, which allows a receiver to adaptively select overlapping, non-overlapping, discrete or consecutive method of group bundling, thus signaling overhead of parameter passing is reduced and flexibility of receiver configuration is increased.

6. Transmission of relevant parameter in a way of implicit notification is provided, thus data information being stolen is avoided and security of system is promoted.

Figure 9:
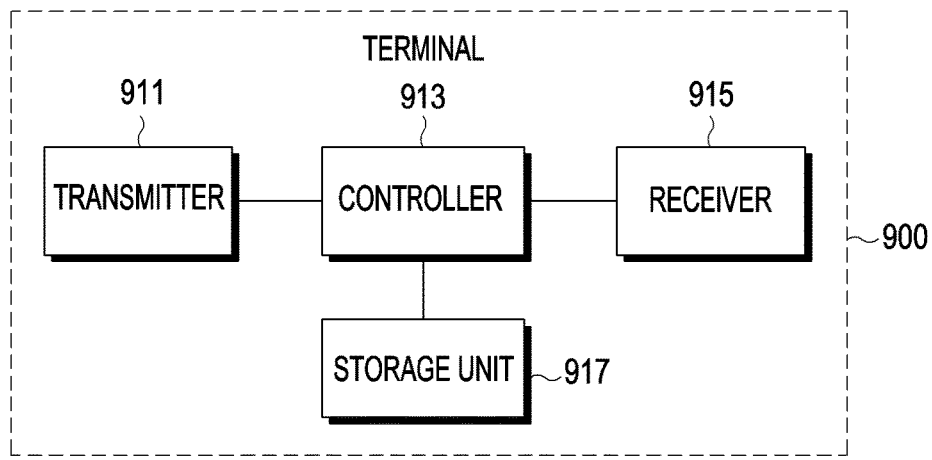
FIG. 9 is a schematic diagram illustrating another example of an inner structure of a terminal according to an embodiment of the present disclosure.

FIG. 9 is a schematic diagram illustrating an example of an inner structure of a terminal according to an embodiment of the present disclosure.

Referring to FIG. 9, a terminal (900) includes a transmitter (911), a controller (913), a receiver (915), and a storage unit (917).

The controller (913) or the receiver (915) comprises at least one of the data receiving module (501), group bundling module (502), and error determining module (503), error feedback module (504).

The controller (913) or the transmitter (911) comprises at least one of the error receiving module (701), the group unbundling module (702), the retransmitted data determining module (703), and the retransmission module (704).

The controller (913) controls the overall operation of the terminal (900). More particularly, the controller (913) controls the terminal (900) to perform an operation of transmitting/receiving a signal in a wireless communication system supporting a distributed antenna system according to an embodiment of the present disclosure, e.g., an operation related to an operation of transmitting/receiving a signal based on a cooperative transmission scheme in a wireless communication system supporting a distributed antenna system according to an embodiment of the present disclosure. The operation related to the operation of transmitting/receiving the signal based on the cooperative transmission scheme in the wireless communication system supporting the distributed antenna system according to an embodiment of the present disclosure is performed in the manner described with reference to FIGS. 1 to 8, and a description thereof will be omitted herein.

The transmitter (911) transmits various signals, various messages, and the like to other entity, e.g., a base station, and the like under a control of the controller (913). The various signals, the various messages, and the like transmitted in the transmitter (911) have been described in FIGS. 1 to 8, and a description thereof will be omitted herein.

The receiver (915) receives various signals, various messages, and the like from other entity, e.g., a base station, and the like under a control of the controller (913). The various signals, the various messages and the like received in the receiver (915) have been described in FIGS. 1 to 8, and a description thereof will be omitted herein.

The storage unit (917) stores a program and various data necessary for the operation of the terminal (900), information related to the operation of transmitting/receiving the signal based on the cooperative transmission scheme in the wireless communication system supporting the distributed antenna system according to an embodiment of the present disclosure, and the like. The storage unit (917) stores the various signals, the various messages, and the like received in the receiver (915).

While the transmitter (911), the controller (913), the receiver (915), and the storage unit (917) are described as separate units, it is to be understood that this is merely for convenience of description. In other words, two or more of the transmitter (911), the controller (913), the receiver (915v), and the storage unit (917) may be incorporated into a single unit. The terminal (900) may be implemented with one processor.

Figure 10:
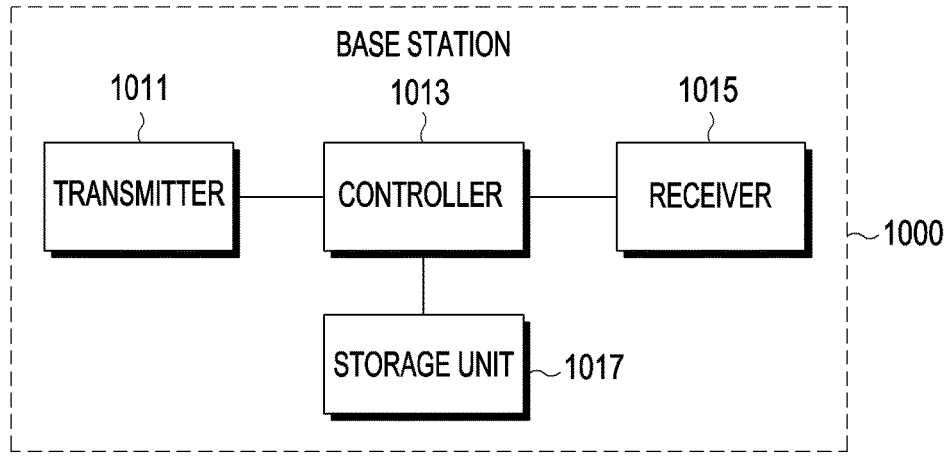
FIG. 10 is a schematic diagram illustrating another example of an inner structure of a base station according to an embodiment of the present disclosure.

FIG. 10 is a schematic diagram illustrating an example of an inner structure of a base station according to an embodiment of the present disclosure.

Referring to FIG. 10, a base station (1000) includes a transmitter (1011), a controller (1013), a receiver (1015), and a storage unit (1017).

The controller (1013) or the receiver (1015) comprises at least one of the data receiving module (501), group bundling module (502), and error determining module (503), error feedback module (504).

The controller (1013) or the transmitter (1011) comprises at least one of the error receiving module (701), the group unbundling module (702), the retransmitted data determining module (703), and the retransmission module (704).

The controller (1013) controls the overall operation of the base station (1000). More particularly, the controller (1013) controls the base station (1000) to perform an operation of transmitting/receiving a signal in a wireless communication system supporting a distributed antenna system according to an embodiment of the present disclosure, e.g., an operation related to an operation of transmitting/receiving a signal based on a cooperative transmission scheme in a wireless communication system supporting a distributed antenna system according to an embodiment of the present disclosure. The operation related to the operation of transmitting/receiving the signal based on the cooperative transmission scheme in the wireless communication system supporting the distributed antenna system according to an embodiment of the present disclosure is performed in the manner described with reference to FIGS. 1 to 8, and a description thereof will be omitted herein.

The transmitter (1011) transmits various signals, various messages, and the like to other entity, e.g., a terminal, and the like under a control of the controller (1013). The various signals, the various messages, and the like transmitted in the transmitter (1011) have been described in FIGS. 1 to 8, and a description thereof will be omitted herein.

The receiver (1015) receives various signals, various messages, and the like from other entity, e.g., a terminal, and the like under a control of the controller (1013). The various signals, the various messages and the like received in the receiver (1015) have been described in FIGS. 1 to 8, and a description thereof will be omitted herein.

The storage unit (1017) stores a program and various data necessary for the operation of the base station (1000), information related to the operation of transmitting/receiving the signal based on the cooperative transmission scheme in the wireless communication system supporting the distributed antenna system according to an embodiment of the present disclosure, and the like. The storage unit (1017) stores the various signals, the various messages, and the like received in the receiver (1015).

While the transmitter (1011), the controller (1013), the receiver (1015), and the storage unit (1017) are described as separate units, it is to be understood that this is merely for convenience of description. In other words, two or more of the transmitter (1011), the controller (1013), the receiver (1015), and the storage unit (1017) may be incorporated into a single unit. The base station (1000) may be implemented with one processor.

It should be understood in the plurality of embodiments of the present disclosure, the disclosed system, device and method can be implemented through other ways. For example, the device embodiment described above is merely illustrative. For example, the separation of units is merely a logical functional separation, and it can also be implemented actually in other way of separation. For example, more than one units or elements can be combined or integrated into another system, or some features are ignored or not implemented. In addition, other items shown or discussed as coupled or directly coupled or communicating with each other may be indirectly coupled or communicating through some interface, device, or intermediate component whether electrically, mechanically, or otherwise.

The units, as separate components to be illustrated, may be physically separated or not, the component, as unit displaying, can a physical unit or not, that is, it can locate at one place or can also be distributed on more than one network units. A portion or all of the units can be selected according to actual needs, in order to achieve objects of the schemes of the embodiment.

In addition, each functional unit in each embodiment of the present disclosure can be integrated into one processing unit, each unit can exist physically, or two or more than two units can also be integrated into one unit. The above integrated units may take the form of a hardware implementation or take the form of a software functional unit implementation.

It should be understood for those skilled in the art that the whole or a portion steps of all the methods of the above embodiments can be accomplished through hardware instructed by program, the program can be stored in computer-readable storage medium, and the storage medium can comprise: Read Only Memory (ROM), Random Access Memory (RAM), disk, CD or other mediums.

Methods and devices provided by the present disclosure are introduced in detail above, for those skilled in the art, according to the idea of the embodiments of the present disclosure, both the specific implementation mode and the application scope will be changed. From the foregoing, the contents of the description shall not be understood to limit the present disclosure.

The invention claimed is:

1. A method for performing a hybrid automatic repeat request (HARQ) feedback by a receiver, the method comprising:
    identifying a type of a group bundling of data units;
    receiving the data units transmitted from a transmitter;
    performing group bundling on the data units based on the identified type of group bundling of data units, wherein the data units are bundled into more than one group;
    determining, according to decoding results of the data units in each group, ACK/NACK information of corresponding groups; and
    transmitting the ACK/NACK information of corresponding groups to the transmitter.

2. The method of claim 1, wherein identifying the type of the group bundling of the data units comprises:
    acquiring, through received common signaling or user specific signaling, parameters for the group bundling, and
    determining, according to a relevant parameter of the group bundling, the type of the group bundling of the data units.

3. The method of claim 1, wherein identifying the type of the group bundling of the data units comprises:
    obtaining a pre-determined rule corresponding to the transmitter, and
    determining, according to the pre-determined rule, the type of the group bundling of the data units.

4. The method of claim 1, wherein identifying the type of the group bundling of the data units comprises:
    acquiring, through received common signaling or user specific signaling, parameters for the group bundling;
    obtaining a pre-determined rule corresponding to the transmitter; and
    determining, according to a relevant parameter of the group bundling and the pre-determined rule, the type of the group bundling of the data units.

5. The method of claim 1, wherein performing the group bundling on the data units comprises:
    performing the group bundling on the data units, wherein adjacent groups, among groups after being ranked, contain at least one same data unit.

6. The method of claim 1, wherein performing the group bundling on the data units comprises:
    performing the group bundling after ranking and indexing data units, wherein, indices of the data units bundled to one same group are non-adjacent.

7. A method for performing a hybrid automatic repeat request (HARQ) retransmission by a transmitter, method comprising:
    identifying a type of a group bundling of data units;
    receiving, from a receiver, ACK/NACK information of bundled groups;
    determining, according to the identified type of group bundling, indices of data units bundled in each group, wherein the data units are bundled into more than one group based on the identified type of group bundling;
    determining, according to the ACK/NACK information of the bundled groups, retransmitted data units in each group; and
    transmitting the retransmitted data units to the receiver.

8. The method of claim 7, wherein identifying the type of the group bundling of the data units comprises:
    acquiring, through received common signaling or user specific signaling, parameters for the group bundling, and
    determining, according to a relevant parameter of the group bundling, the type of the group bundling of the data units.

9. The method of claim 7, wherein identifying the type of the group bundling of the data units comprises:
    obtaining a pre-determined rule corresponding to the receiver, and
    determining, according to the pre-determined rule, the type of the group bundling of the data units.

10. The method of claim 7, wherein identifying the type of the group bundling of the data units comprises:
    acquiring, through received common signaling or user specific signaling, parameters for the group bundling;
    obtaining a pre-determined rule corresponding to receiver; and
    determining, according to a relevant parameter of the group bundling and the pre-determined rule, the type of the group bundling of the data units.

11. The method of claim 7, wherein determining, according to the ACK/NACK information of the bundled groups, retransmitted data units in the each groups comprises:
    for the groups that the ACK/NACK information is NACK, determining a bundled data units, which are different with the data units being decoded correctly, as retransmitted data units, wherein the data units being decoded correctly contain all the data units bundled in the groups that the ACK/NACK information is ACK.

12. A receiver for performing a hybrid automatic repeat request (HARQ) feedback, the receiver comprising:
    a controller configured to:
        identify a type of a group bundling of data units;
        receive the data units transmitted from a transmitter;
        perform group bundling on the data units based on the identified type of the group bundling of data units, wherein the data units are bundled into more than one groups;
        determine, according to decoding results of the data units in each group, ACK/NACK information of corresponding the groups; and
        transmit the ACK/NACK information of corresponding groups to the transmitter.

13. The receiver of claim 12, wherein the controller is further configured to acquire, through received common signaling or user specific signaling, parameters for the group bundling and determine, according to a relevant parameter of the group bundling, the type of the group bundling of the data units.

14. The receiver of claim 12, wherein the controller is further configured to obtain a pre-determined rule corresponding to the transmitter and determine, according to the pre-determined rule, the type of the group bundling of the data units.

15. A transmitter for performing a hybrid automatic repeat request (HARQ) retransmission, the transmitter comprising:
   a controller configured to:
      identify a type of a group bundling of data units;
      receive, from a receiver, ACK/NACK information of bundled groups;
      determine, according to the identified type of group bundling, indices of data units bundled in each group, wherein the data units are bundled into more than one group based on the identified type of group bundling;
      determine, according to the ACK/NACK information of the bundled groups, retransmitted data units in each group; and
      transmit the retransmitted data units to the receiver.

16. The transmitter of claim 15, wherein the controller is further configured to, in the groups that the ACK/NACK information is NACK, determine a bundled data units, which are different with the data units being decoded correctly, as retransmitted data units, and
   wherein the data units being decoded correctly contain all the data units bundled in the groups that the ACK/NACK information is ACK.

* * * * *